United States Patent [19]

Ujihara

[11] Patent Number: 5,229,596
[45] Date of Patent: Jul. 20, 1993

[54] IMAGE SENSOR HAVING SPECIFIC DETECTOR STRUCTURE

[75] Inventor: Takashi Ujihara, Yamagata, Japan

[73] Assignees: Tohoku Pioneer Electronic Corp., Tendo; Pioneer Electronic Corp., Tokyo, both of Japan

[21] Appl. No.: 864,727

[22] Filed: Apr. 7, 1992

[30] Foreign Application Priority Data

Aug. 6, 1991 [JP] Japan .................................. 3-219251

[51] Int. Cl.⁵ ............................................. H01J 40/14
[52] U.S. Cl. ................................. 250/208.1; 257/443; 257/458
[58] Field of Search ...................... 250/208.1; 257/443, 257/444, 448, 458, 459

[56] References Cited

U.S. PATENT DOCUMENTS

| | | | |
|---|---|---|---|
| 4,408,230 | 10/1983 | Tamura et al. ................ | 250/208.1 |
| 4,727,407 | 2/1988 | Nobue et al. .................. | 257/448 |
| 4,758,734 | 7/1988 | Uchida et al. ................. | 257/443 |
| 4,855,802 | 8/1989 | Kato ............................. | 250/208.1 |
| 5,142,137 | 8/1992 | Kushino et al. ............... | 250/208.1 |
| 5,162,644 | 11/1992 | Nagata et al. ................. | 250/208.1 |

FOREIGN PATENT DOCUMENTS 2-202056  8/1990  Japan .

Primary Examiner—David C. Nelms
Assistant Examiner—Stephone Allen
Attorney, Agent, or Firm—Nikaido, Marmelstein, Murray & Oram

[57] ABSTRACT

An insulating substrate having an end opposite to a sheet of subject copy is disposed perpendicularly to the sheet. A plurality of photodetector units are provided on the end of the insulating substrate. Each of the photodetector units has a first electrode film connected to a common electrode disposed on one of the sides of the insulating substrate, a second electrode film connected to one of discrete electrodes disposed on the other side of the insulating substrate, and a photoelectric transducer film interposed between the first and second electrode films.

4 Claims, 5 Drawing Sheets

IMAGE SENSOR HAVING SPECIFIC DETECTOR STRUCTURE

BACKGROUND OF THE INVENTION

The present invention relates to an image sensor provided in a facsimile transmitter for reading an image on the subject copy.

A conventional image sensor comprises a charge coupled device (CCD) or an array of self-focusing rod lenses. Consequently, it is difficult to largely reduce the space taken up by the sensor and hence the size of the facsimile equipment. Accordingly, in order to provide a compact facsimile equipment, there has been proposed a contact-type image sensor where the distance between a sheet of subject copy and the sensor is reduced.

Japanese Patent Application Laid-Open 2-202056 discloses one of the contact-type image sensors where a light-emitting device and a photodetector are mounted on the same surface of the substrate, thereby reducing the size of the image sensor. Such an image sensor is shown in FIG. 9. The image sensor has a base plate 1 made of glass, ceramics or metal, on which a light-emitting unit 2 and an array of photodetector units 3 are mounted. The light-emitting unit 2 comprises an insulting substrate 2a, lower electrode 2b, light-emitting film 2c, and an upper electrode 2d, laminated subsequently one after the other.

Each photodetector unit 3 has an amorphous-silicon photoelectric transducer film 3c which is interposed between a common electrode film 3b disposed on an insulting substrate 3a and a discrete electrode 3d. The light-emitting unit 2 and the photodetector units 3 are covered with a protecting film 4 made of silicon or resin. A sheet 5 of subject copy, the image of which is to be transmitted, travels above the film 4.

In operation, a beam of light is emitted from the light-emitting film 2c to the sheet 5 passing through the protecting film 4. The beam is reflected on the sheet 5 and applied to the photodetector units 3. The light beam is converted into electric energy, namely to electric current, by the photoelectric transducer film 3c and transmitted to an external member through discrete electrode 3d. Thus, the image is read so as to be transmitted to a facsimile receiver.

Referring to FIG. 10, in another type of contact-type image sensor, a LED bar array 2e as a light-emitting means is provided above the image sensor body. The image sensor has a glass base substrate 1a, on the underside of which is mounted the common electrode film 3b and the photoelectric transducer film 3c. The discrete electrodes 3d each comprising a transparent conductive film 3e and a metal film 3f are further formed on the substrate 1a. A hole 2f is formed in each laminated photodetector unit 3, thereby allowing light beams from the LED bar array 2e, which is disposed over the glass substrate 1a, to reach the sheet 5. Resin 4a is filled in a space between the photodetector unit 3 and a protecting glass plate 4c. In order to maintain the distance between the transparent conductive film 3e and the sheet 5 constant, a plurality of resin particles 4b are embedded in the resin 4a.

An untransparent material is applied on the inner periphery of the hole 2f to form a coating 3g so that the direct beam from the LED bar array is prevented from being sensed by the photoelectric transducer film 3c.

As the sheet 5 is carried by a feed roller 5a in a direction D, the light beams from the LED bar array 2e are introduced through the holes 2f and reflected on the sheet 5. The quantity of the reflected light beams, that is difference of lightness on the surface of the sheet 5 is detected by each photodetector unit 3, and applied to an external member through the corresponding discrete electrode 3d.

In order to accurately read the image on the sheet 5, it is necessary to maintain the distance between the sheet 5 and the photodetector unit 3 constant. However, in the conventional image sensor, the sheet 5 is supplied and passed through the image sensor in parallel to the substrate 1 while trying to maintain the contact with the surface of the protecting film 4. As a result, the sheet 5 is apt to flutter, thereby varying the distance between the sheet and the photodetector unit 3. Hence the difference in lightness is affected so that only a poor reading accuracy is achieved.

Such fluttering can be restrained to a certain extent when the feed roller 5a urges the sheet 5 against the glass plate 4c as shown in the conventional image senor of FIG. 10. However, the force cannot be evenly exerted on the sheet along the whole axial length of the roller, thereby rendering it difficult to maintain the same distance between the sheet 5 and the photodetector unit 3. Moreover, a device for precisely adjusting the force applied by the feed roller 5a must be provided so that the construction of the facsimile transmitter becomes complicated.

In addition, since the image sensor is laterally disposed, a large space is occupied, so that the size of the facsimile equipment cannot be reduced. More particularly, in the image sensor shown in FIG. 9, a cumbersome operation of mounting the light-emitter unit 2 and the photodetector units 3 on the substrate is required. In the sensor shown in FIG. 10, the need of the coating 3g, for example, makes the construction of the photodetector unit complicated, thereby increasing the manufacturing cost of the image sensor.

SUMMARY OF THE INVENTION

An object of the present invention is to provide a compact and lightweight image sensor wherein the distance between the sheet of subject copy and the photodetector is maintained constant.

According to the present invention, there is provided an image sensor comprising an insulating substrate having an end opposite to a sheet of subject copy, a light-emitting unit and a plurality of photodetector units provided on the end of the insulating substrate, the image of the sheet is to be read by the image sensor. Each photodetector unit has a first electrode film connected to a common electrode disposed on one side of the insulating substrate, a second electrode film connected to a discrete electrode disposed on the other side of the insulating substrate, and a photoelectric transducer film interposed between the first and second electrode films.

In an aspect of the invention, the light-emitting unit is disposed such that light beams therefrom which reflect on the sheet appropriately enter respective photodetector units.

In the image sensor of the present invention, since the photodetector units which confront the sheet are disposed on the longitudinal end portion of the image sensor, it is possible to decrease the space occupied by the image sensor in the traveling direction of the sheet, thereby reducing the size of a facsimile equipment. In addition, the length of the area of the image sensor which contacts the sheet is also decreased so that the fluttering of the sheet is prevented. Thus the sheet can be accurately positioned with respect to the image sensor, thereby accurately detecting the differences of lightness of the sheet with the photodetector units. Namely, a compact and lightweight image sensor capable of accurately reading the image is obtained.

The other objects and features of this invention will become understood from the following description with reference to the accompanying drawings.

DETAILED DESCRIPTION OF THE PREFERRED EMBODIMENTS

Figure 1:
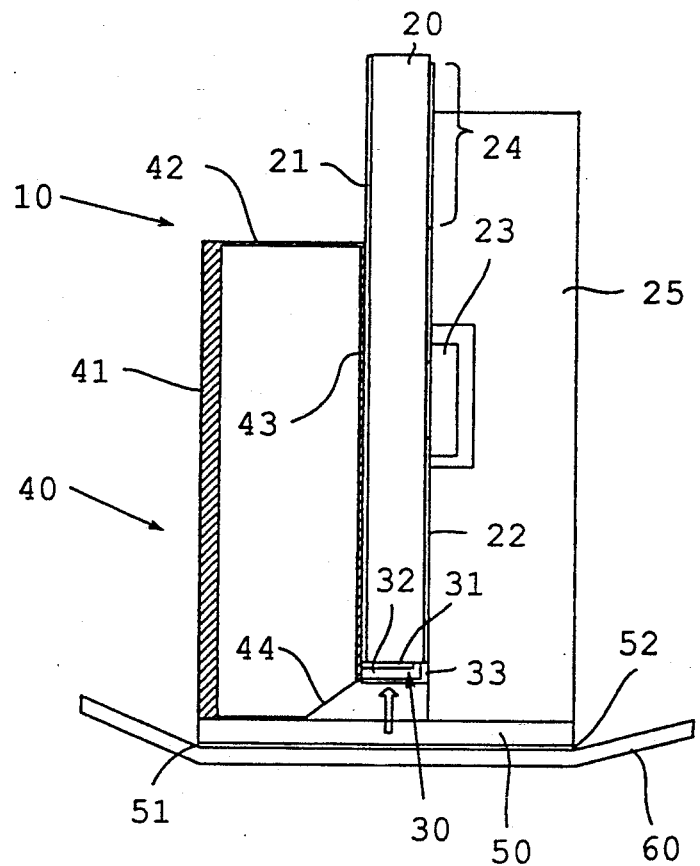
FIG. 1 is a sectional view of a contact-type image sensor of a facsimile transmitter according to the present invention.

Referring to FIG. 1, an image sensor 10 according to the present invention has a double-sided insulating substrate 20 having a thickness of 0.1 mm, mounted on a holder 25. On one side of the substrate opposite the holder 25, a common electrode 21 is disposed, and on the other side, a plurality of discrete electrodes 22 in predetermined patterns are disposed. The insulting substrate 20 may be of resin, which is the most commonly used material, glass-epoxy material, or a metal plate which is coated with an insulating material. Each discrete electrode 22 is connected to a collective substrate portion 24 through a driver IC 23.

Mounted on the bottom end face of the insulting substrate 20, opposite to a sheet 60 of the subject copy, is a plurality of photodetector units 30 arranged in the lateral direction of the sheet, each comprising a first electrode film 31 connected to the common electrode 21, amorphous-silicon photoelectric transducer film 32 mounted on the first electrode film 31, and a tranparent second electrode film 33 mounted on the photoelectric transducer film 32 and connected to the corresponding discrete electrode 22. The films 31 to 33 are formed by appropriate conventional methods, such as plating, sputtering, ion plating, vacuum deposition and chemical vapor deposition (CVD).

For example, a film of chromium having a thickness of 0.2 $\mu$m is plated on the insulating substrate 20, thereby forming the first electrode film 31. A film of amorphous-silicon is precipitated by the CVD method to form the photoelectric transducer film 32. Thereafter, a transparent ITO film having a thickness of 0.2 $\mu$m is plated on the photoelectric transducer film 32 to form the second electrode film 33.

A light-emitting unit 40 is disposed adjacent the common electrode 21 at the opposite side of the holder 25. The light-emitting unit 40 has a rectangular casing 42, one wall of which is attached to the insulting substrate 20. On an inner wall opposite the substrate 20, an electroluminescence (EL) device 41 is mounted, and on the opposing wall, a reflecting film 43 is mounted. A bottom edge of the casing 42 adjacent the insulating substrate 20 is obliquely cut away so as to form an opening 44. It is preferable to form the opening 44 in such a manner that the lower edge of the casing 42 adjacent the photodetector unit 30 is positioned lower than the bottom surface of the photodetector unit 30 to shield the photodetector unit 30 from directly sensing the light beams emitted from the EL device 41. Alternatively, the edge of the photoelectric transducer film 32 adjacent the reflecting film 43 may be coated with a light-shield coating.

The casing 42 and the holder 25 are supported by a protecting glass plate 50, under which a sheet 60 of subject copy travels, thereby maintaining the relative positions of the light-emitting unit 40 and the photodetector unit 30. In order to keep the sheet 60 in close contact with the glass plate 50, the length of the glass plate 50 in moving direction of the sheet is preferably 2 mm or shorter. More particularly, if the glass plate 50 is longer than 2 mm, the sheet 60 cannot be in contact with the plate 50 at the entire length thereof, which may cause the fluttering of the sheet. As a result, the distance between the sheet 60 and the photodetector unit 30 may fluctuate. In addition, it is preferable to form a curve on each of the front and rear edges 51 and 52 of the glass plate 50 so as to protect the sheet 60 from injury.

Figure 2:
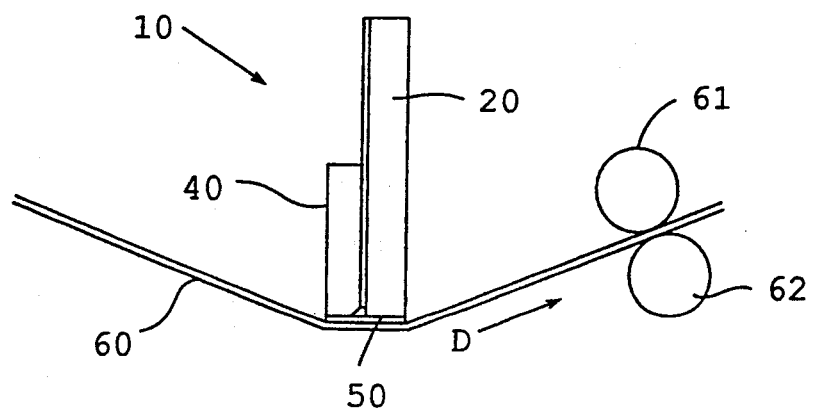
FIG. 2 is a schematic side view showing the image sensor in operation.
Figure 10:
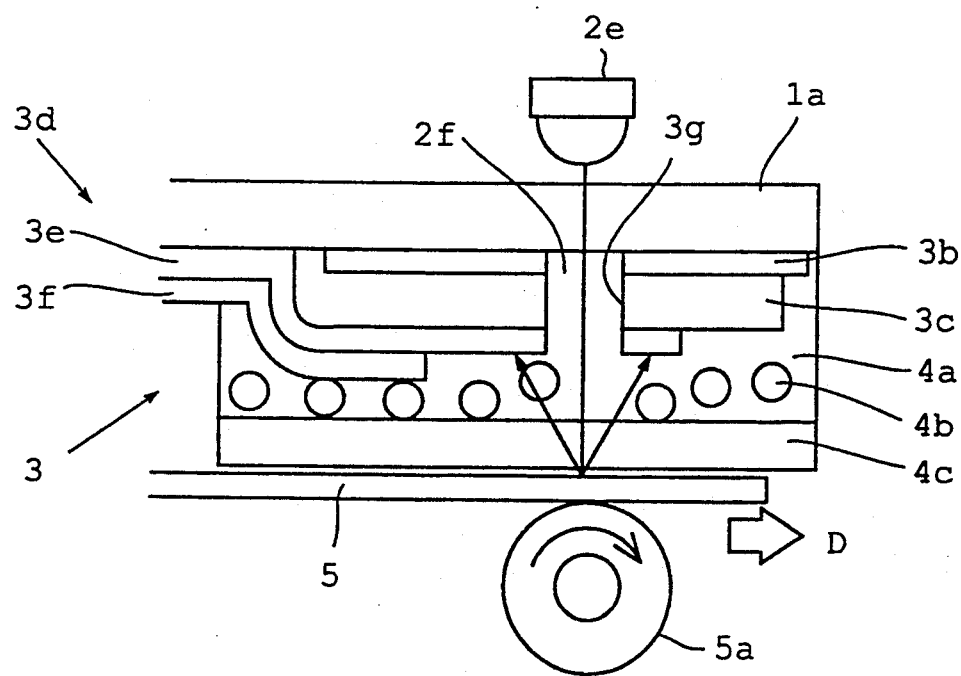
FIG. 10 is a sectional view of another conventional contact-type image sensor, having an LED bar array as the light-emitting means.

The image sensor 10 is so disposed as shown in FIG. 2 that the copy sheet 60, which passes in the direction D under the image sensor 10 by a drive roller 61 and a nipping roller 62, is bent at the front and rear edges 51 and 52. It will be understood that the length of the portion of the image sensor 10 which contacts the sheet 60 is greatly reduced compared to that in the conventional image sensor shown in FIG. 10. The sheet 60 is thus evenly urged against the entire surface of the glass plate 50. Hence, the sheet 60 can travel while keeping the contact with the glass plate 50 under a constant condition without using the feed roller as roller 5a in FIG. 10.

In operation, the copy sheet 60 is irradiated with light beams emitted from the EL device 41 through the opening 44. The beams reflected on the surface of the sheet 60 enter each photodetector unit 30 so that the quantity thereof is converted into the electric signals by the photoelectric transducer film 32. Since the distance between the sheet 60 and the glass plate 50, and hence the distance between the films 32 and the sheet 60 do not vary, the electric signals accurately correspond to the information recorded on the sheet 60. Thus, the reading accuracy of the image sensor is remarkably improved.

Figure 3:
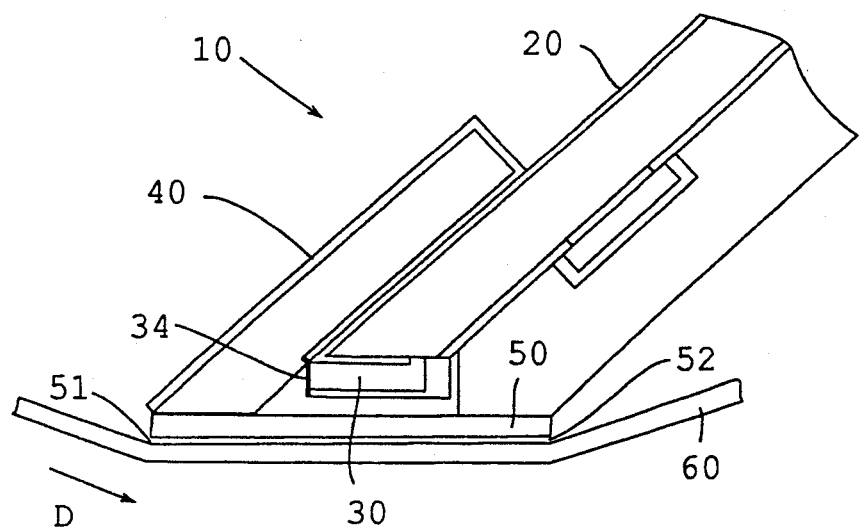
FIGS. 3 to 8 show side views of other embodiments of the image sensor according to the present invention.

Referring to FIG. 3, showing a second embodiment of the present invention, the image sensor 10 has a slanted disposition with respect to the traveling copy sheet 60. When the sheet 60 travels in the direction D, the sheet is appropriately caught at the front edge 51 of the glass plate 50 so as to be in a close contact with the entire surface of the glass plate 50. If the image sensor is adapted to drive the copy sheet 60 in the opposite direction, the sheet 60 smoothly starts the contact with the plate 50 at the edge 52, hence preventing damage to the sheet 60.

Moreover, the bottom end surface of the insulting substrate 20 is expanded so that the surface area of the photoelectric transducer film 32 can be increased. Thus an increased quantity of light which is reflected on the sheet 60 can be detected by the transducer film 32, thereby enabling the reading of the image on the sheet 60 with an improved accuracy. In the embodiment illustrated in FIG. 3, the photodetector unit 30 has a shield coating 34 at the edge portion adjacent the light-emitting unit 40 so as to prevent the light beams from directly entering the photoelectric transducer films 32.

Figure 4:
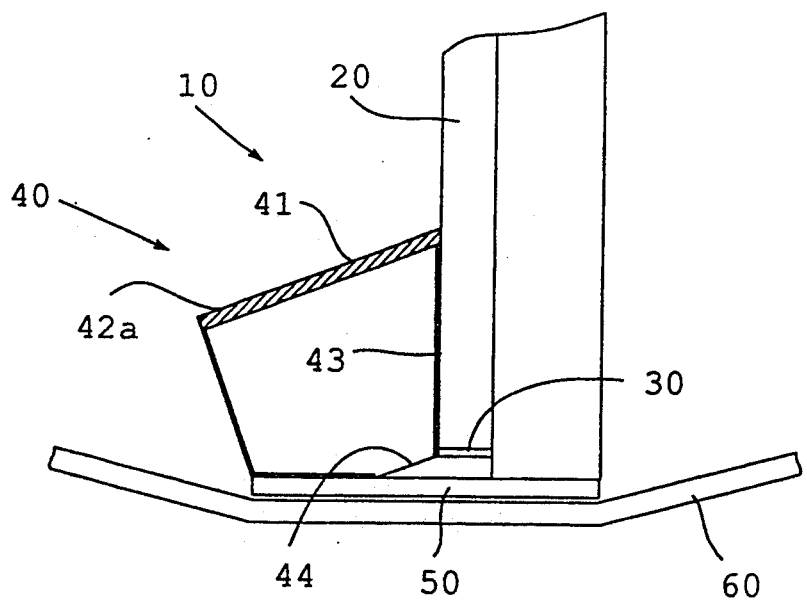
Figure 5:
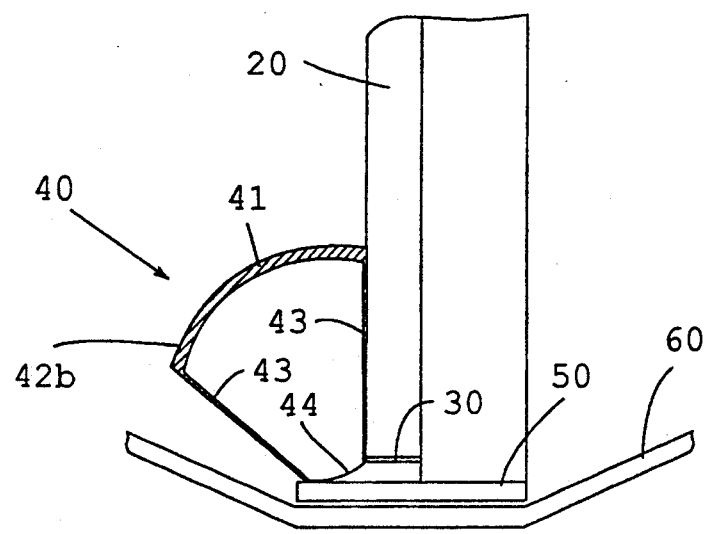

FIGS. 4 and 5 show other embodiments of the image sensor wherein each casing has a shape other than a rectangular shape in order to effectively focus the light beams from the EL device 41 on the sheet 60.

Referring to FIG. 4, a casing 42a has a trapezoidal cross section. The EL device 41 is attached on the underside of the roof of the casing 42a and the reflecting film 43 is mounted on the side wall adjacent the insulating substrate 20. Since the EL device 41 is positioned to overlook the opening 44, the ratio of the light beams which reach the copy sheet 60 through the opening 44 and the glass plate 50 to all of the light beams emitted from the EL device 41 is increased. Hence attenuation caused by the reflections in the casing is decreased.

In the embodiment shown in FIG. 5, a casing 42b has a contour of a sector-shape in cross section, an arcuated roof of which is designed to overlook the opening 44. The curvature of the arcuated roof of the casing 42b is adapted to focus the beams therefrom on the copy sheet 60. The reflecting films 43 are formed on both side walls. As a result, the focusing efficiency of light beams is improved.

Figure 6:
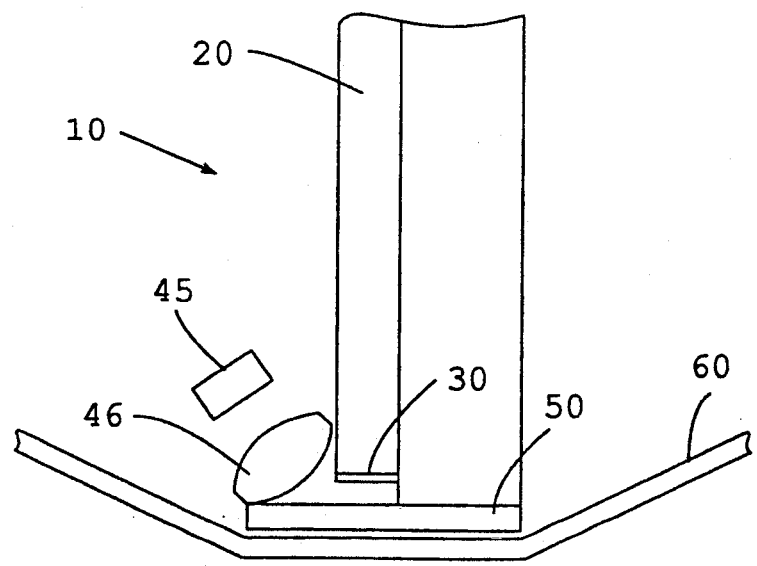

In the embodiment shown in FIG. 6, the casing is removed and an LED 45 is provided as a light-emitting device. Laser beams radiated from the LED 45 is converged by a cylindrical lense 46 and focused on the sheet 60. Since the laser beam has a good directivity, the beam passes through the cylindrical lense 46 without diffusing.

Figure 7:
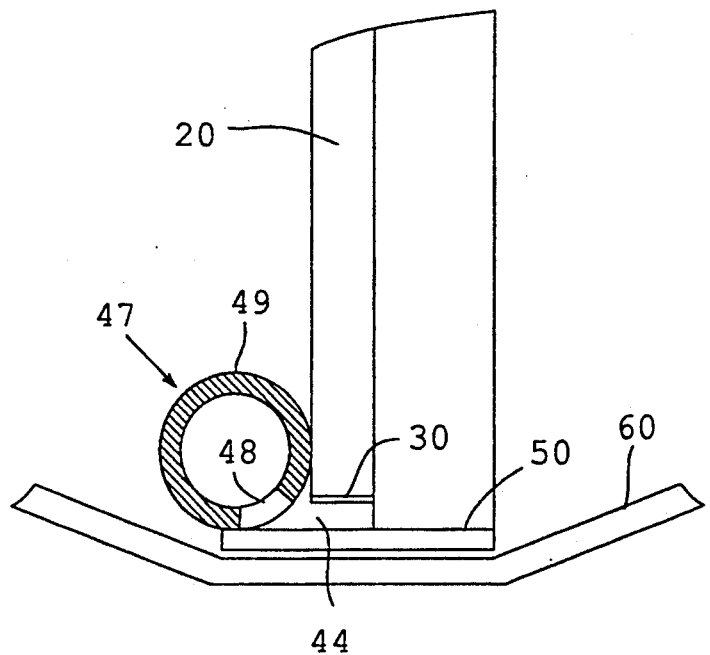

Referring to FIG. 7, there is provided, as a light-emitting device, a fluorescent lamp 47 having a small diameter, for example between 2 mm to 4 mm, adjacent the insulating substrate 20 and the glass plate 50. The fluorescent lamp 47 has a light-transmissive strip portion 48 axially extending along the periphery thereof so as to oppose the opening 44. The remaining peripheral portion consists of a light shielding portion 49. Hence the light from the fluorescent lamp 47 is transmitted only through the light-transmissive strip portion 48 to effectively irradiate the copy sheet 60 through the glass plate 50.

Figure 8:
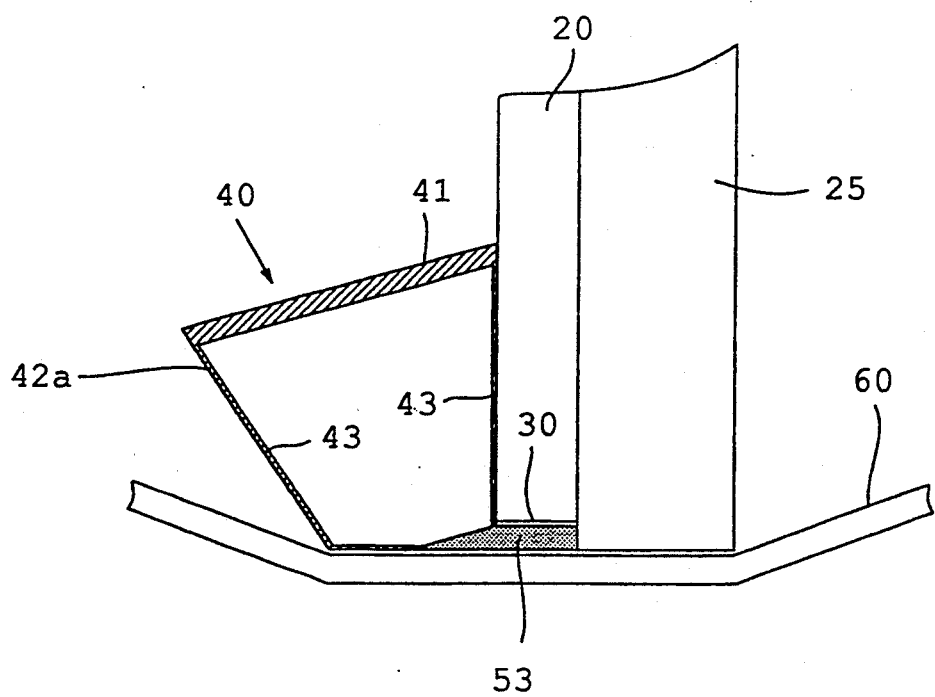
Figure 9:
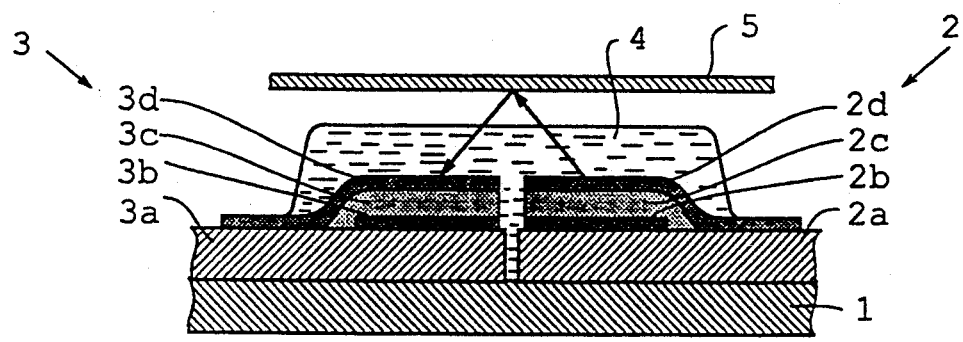
FIG. 9 is a sectional view of a conventional contact-type image sensor, having light-emitting means and photodetector means on the same surface of a substrate.

The protecting glass plate 50 is omitted in an image sensor shown in FIG. 8. The image sensor has a trapezoidal section casing 42a similar to that of the sensor of FIG. 4. A space defined by the light-emitting unit 40, the photodetector unit 30 and the holder 25 is filled with resin 53 having a high transparency, such as polyimide resin, epoxy resin and polycarbonate resin so as to substitute for the glass plate. Thus, the copy sheet 60 directly touches the surface of the casing 42a and holder 25 while being delivered.

As a result, the distance between the photodetector unit 30 and the sheet 60 is decreased, thereby improving the focusing efficiency of the light beams, which means that the quantity of light emitted from the EL device 41 can be reduced. Fluorine-contained polymer having a lubricative quality may be applied on the bottom surfaces of the casing 42a and the holder 25, thereby rendering the sheet 60 to smoothly travel without damage.

From the foregoing, it will be understood that, in the image sensor of the present invention, the copy sheet opposes the longitudinal bottom end of the insulting substrate which is arranged in substantially upright disposition. Therefore, since the area of the sheet which is in contact with the image sensor is reduced, the fluttering of the sheet is prevented, thereby enabling to accurately read the image on the sheet. Furthermore, the substrate is perpendicular to or slanted toward the travelling direction of the copy sheet, so that a compact image sensor and hence a compact and lightweight facsimile equipment can be obtained. Since each of the light-emitting units and the photodetector unit has a simple construction, an image sensor capable of accurately reading the sheet can be manufactured at a low cost.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An image sensor comprising:
    an insulating substrate having an end opposite to a sheet of subject copy;
    a common electrode disposed on one of sides of the insulating substrate;
    discrete electrodes disposed on the other side of the insulting substrate;
    a plurality of photodetector units provided on the end of the insulting substrate opposite to the sheet;
    each of the photodetector units having a first electrode film connected to the common electrode, a second electrode film connected to each of the discrete electrodes, and a photoelectric transducer film interposed between the first and second electrode films.

2. An image sensor according to claim 1 further comprising a light-emitting unit disposed on the image sensor so that beams of light emitted from the light-emitting unit reflect on the sheet and applied to the photodetector units.

3. An image sensor according to claim 1 wherein the insulating substrate is disposed perpendicularly to the sheet.

4. An image sensor according to claim 1 wherein the insulating substrate is disposed obliquely to the sheet.

* * * * *